United States Patent

[11] 3,589,592

| [72] | Inventor | Ruben A. Tigner<br>Bay City, Mich. |
|---|---|---|
| [21] | Appl. No. | 620,216 |
| [22] | Filed | Mar. 1, 1967 |
| [45] | Patented | June 29, 1971 |
| [73] | Assignee | The Dow Chemical Company |

[54] FOAM RECEPTACLE
17 Claims, 3 Drawing Figs.

[52] U.S. Cl................................................. 229/3.5,
229/1.5, 264/46, 264/93, 264/321, 161/159,
161/160, 161/161
[51] Int. Cl....................................................... B65d 1/00,
B32b 7/00
[50] Field of Search............................................ 161/159,
160, 161; 264/46, 93, 321; 206/46 FC; 229/3.5,
1.5; 220/9 F

[56] References Cited
UNITED STATES PATENTS

| 3,138,248 | 6/1964 | Abbott | 206/46 FCM |
|---|---|---|---|
| 3,160,925 | 12/1964 | Gort | 161/161 |
| 3,170,832 | 2/1965 | Wilson et al. | 161/161 |
| 3,396,062 | 8/1968 | White | 161/160 |
| 3,306,967 | 2/1967 | Turkewitsch | 161/190 |

*Primary Examiner*—William J. Van Balen
*Attorneys*—Griswold & Burdick, Richard G. Waterman and Lloyd E. Hessenaur, Jr.

ABSTRACT: A foam receptacle, such as a disposable cup, having walls comprised of laminated plies of plastic foam sheet.

PATENTED JUN 29 1971 3,589,592

INVENTOR.
Ruben A. Tigner
BY

ATTORNEY

FOAM RECEPTACLE

This invention relates generally to receptacles formed from foam sheet materials. More particularly, it relates to novel plastic foam receptacles thermoformed from laminated plies of plastic foam sheet.

In the past it has often been customary to provide plastic foam receptacles in a variety of forms including trays, cartons, cups, etc., for the packaging of many commodities such as meats, eggs, fresh produce, and hot and cold drinks. More recently, a host of new foam receptacles are being explored for use in various markets. These receptacle include foam ice cream cups, picnic plates, soup bowls, and dishes for carryout service of hot foods.

Since foam receptacles are often of the disposable kind, it is essential that foam fabricators provide a foam receptacle which can compete in cost with a variety of competing counterparts, especially the cheaply produced pulp and paper receptacles, while yet maintaining the quality of the receptacle.

Many of the present day foam receptacles are fabricated by relatively slow and expensive foaming in place methods. These methods usually comprise the placing of expandable plastic beads in a mold having opposed surfaces defining the desired receptacle shape, and then expanding the beads to fit the contours of the mold.

Apparently, one of the reasons sheet thermoformed foam receptacles have not made greater inroads in the marketplace is that while sheet thermoforming is relatively inexpensive, it has sometimes resulted in receptacles having certain shortcomings, especially where deep drawing (as, for example, plug assist vacuum forming) has been involved. Deep drawing items such as cups or tumblers from plastic foam sheet requires considerable stretching and thinning of the sheet with the result that often the sidewall lacks sufficient structural rigidity. To counteract this, some fabricators use higher density foam sheets than would otherwise have been desirable, and more rigidity does result. However, such higher density receptacles are substantially more brittle and fragile, and breakage becomes a problem.

Structural deficiencies in prior receptacles thermoformed from foam sheet also can result from undesirably large cells or nonuniform cell sizes. Generally, the smaller the cell size in foam receptacles, the tougher and more flexible the receptacle. Conversely, large cell structures significantly contribute to brittleness. Even in receptacles of generally small cell size, the presence of irregular, nonuniform large cells at various points in the receptacle body form weak spots from which cracks tend to propagate. The structural weakening caused by the formation of nonuniform large cells is further aggravated when such cells occur near or on the other surfaces of the receptacle, for at these points the internal stresses caused by flexing actions are greatest. To remedy this problem it is necessary to control cell growth and cell size uniformity when forming the foam sheet raw material. Such a degree of quality control, however, has often proven difficult, especially with the relatively thicker foam sheets. It is believed that the difficult control problems encountered are caused by the inability to rapidly and uniformly cool the sheet upon extrusion or other forming so as to "freeze" cell growth at a particular point. Rapid and uniform cooling, of course, is severely hampered by the excellent insulation characteristics of foam sheet, especially the thicker sheets which have correspondingly higher insulation values. Consequently, where it might otherwise be desirable to use thicker, lower density foam sheets for thermoforming receptacles, i.e., for forming the more deeply drawn receptacles, the receptacles formed thereby can often be unsatisfactory because of the frequent presence of undesirably large or nonuniform cells in thicker sheets.

Accordingly, it is an object of the invention to provide a new and improved foam sheet thermoformed receptacle which is sufficiently stiff without being unsatisfactorily brittle.

Another object is to provide a relatively deep thermoformed foam receptacle which can be thermoformed from relatively low density foam sheets.

Still another object is to provide a thermoformed foam receptacle which does not break or crack easily.

Yet another object is to provide a thermoformed plastic foam receptacle which lends itself readily to different interior and exterior finishes and coloring, which receptacle can provide an excellent printing surface together with higher quality utility characteristics.

Briefly then, this invention relates to foam receptacles thermoformed from laminated plies of plastic foam sheet. The receptacle can comprise two or more plies, which plies can be individually selected as to cell size, closed or open cells, foam density, color, particular plastic foam (i.e., polystyrene), thickness, etc., to give the composite properties desired as to each particular receptacle. Each respective ply, forming only a fraction of the total thickness of the receptacle wall, can be relatively thin and thus, formed from correspondingly thin foam sheet material. These thinner sheets can be better controlled during extrusion or other forming to provide more uniform and desirable cell size. Thus, in the more deeply drawn receptacles, required sheet formability or stretchability can be obtained by increasing thickness, through the stacking of individually relatively thin foam sheets, rather than by increasing density, thereby significantly reducing receptacle brittleness without incurring the structural deficiencies caused by undesirably large cells or nonuniform cell sizes. The plies can be laminated together by heat sealing where compatible, or with adhesives or solvents. Further, if desired, the lamination can be spotted (or a noncontinuous nature) allowing a degree of slippage at the interface of adjacent plies to gain even better receptacle toughness and flexibility characteristics.

Yet additional objects and advantages of the present invention and its numerous cognate benefits and features are even more apparent and manifest in and by the ensuing description taken in conjunction with the accompanying drawing in which, wheresoever possible, like characters of reference designate corresponding materials and parts throughout the several views thereof in which.

Figure 1:
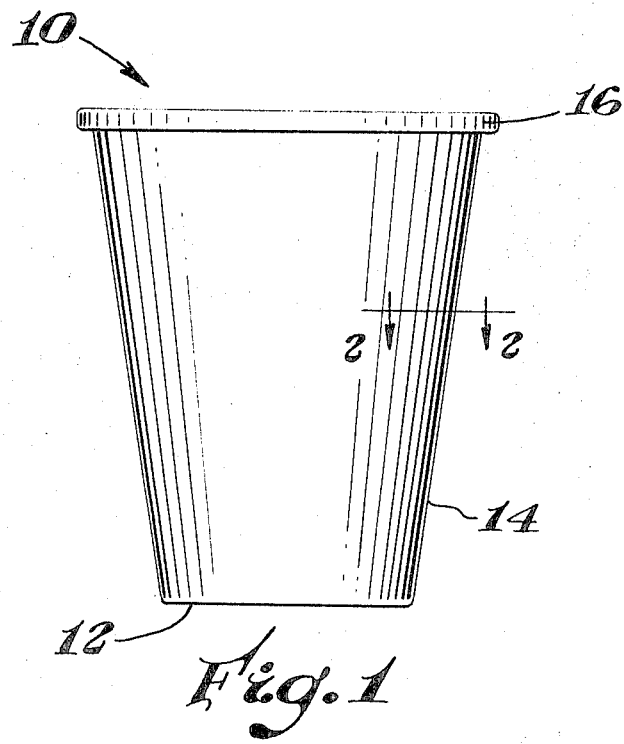
FIG. 1 is an elevational view of a foam drinking cup constructed according to the principles of this invention.
Figure 2:
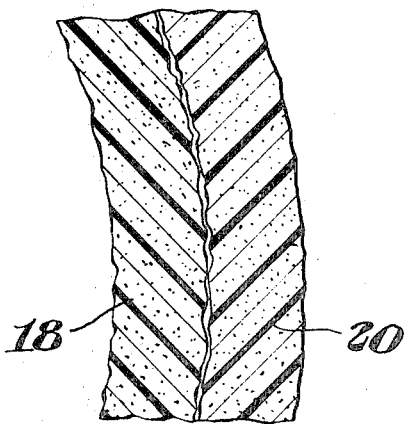
FIG. 2 is a greatly enlarged fragmentary cross-sectional view taken along reference line 2–2 of FIG. 1.

Referring now more particularly to the drawing, there is shown in FIGS. 1 and 2, a receptacle or cup 10 thermoformed from foam sheet, which is of a generally frustoconical shape. It should be understood, however, that this is but a typical shape and design, and that numerous different types of receptacles such as trays, cartons, underliners, plates, etc., can also employ the principles of this invention.

Cup 10 comprises a circular bottom wall 12 continuously merged at its outer peripheral edge to an upwardly and outwardly extending sidewall 14. Sidewall 14 ends at its upper edge in an outwardly extending continuous beadlike peripheral rim 16.

Walls 12 and 14 of cup 10 are of a laminated construction, as shown in FIG. 2, and comprise inner and outer plastic foam plies 18 and 20 respectively. The plies are preferably secured together by heat sealing where compatible but can be secured by other well-known techniques such as by adhesives or by solvents. Each ply can be individually selected as to foam density, foam cell size, open or closed cells, particular plastic foam (i.e., polystyrene foam), thickness, and color to provide the composite properties desired, such as would be determined by the use, size and configuration of the particular cup or receptacle. Since the particularly illustrated receptacle, cup 10, would normally be used to serve hot or cold drinks, a clean-appearing white inner ply 18 formed of an impermeable closed cell foam, such as closed cell polystyrene, would be advantageous. Similarly, if the use contemplated required decorating on the exterior of cup 10, outer ply 20 could both be pigmented to provide background color, and also formed of a fine cell foam, such as fine cell polystyrene foam, which as relatively superior printing characteristics. Further, if it were determined that the above more flexible fine cell structure of outer ply 20 reduced the stiffness of cup 10 below the required level, the inner ply 18 could be stiffened by increasing its relative thickness, foam density, or a cell size or some combination thereof, to adequately compensate for the loss of stiffness incurred by the outer ply 20.

Other important advantages of cup 10 are superior sheet thermoforming and structural characteristics.

Each of the individual plies of cup 10 is relatively thin, comprising only a fraction of the total thickness of the cup wall, and can be formed from relatively thin foam sheet which is more easily controlled as to cell size and cell size uniformity. This better control greatly lessens the above-discussed structural deficiencies caused by undesirably large cells and nonuniform cell sizes. However, even if such deficiencies are present in the receptacles of this invention, the laminated construction of such receptacles, of individual relatively thin plies, significantly reduces internal stresses, thus lessening the possibility of rupturing of the receptacles.

Figure 3:
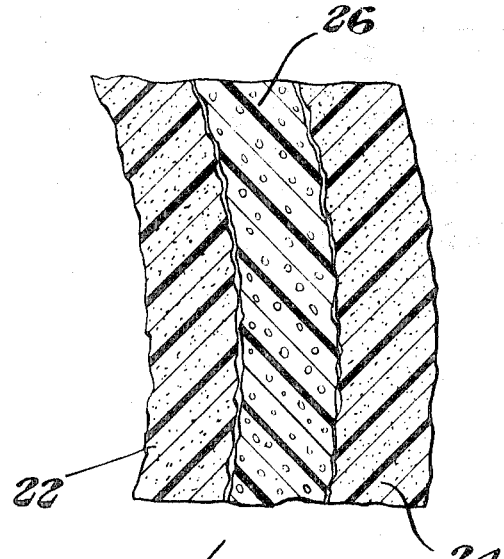
FIG. 3 is a view like FIG. 2 only showing a modified form of the invention.

For example, a typical cup 10 having desirable structural properties can be thermoformed from two sheets of 100 mil thick polystyrene foam having a density of about 10 lbs./cu. ft. and an average cell size of about 0.1 millimeters to about 0.15 millimeters. The sheets are first placed in a stacked relationship and then heated to a pliable temperature. The heat can be generated by infrared rays, which despite the normally excellent insulating properties of foam sheet, have been found to penetrate the foam material sufficiently to adequately heat it throughout. The sheets are then placed over the mouth of a mold having a cup-shaped cavity corresponding to the outer peripheral configuration of cup 10 and pressure thermoformed to mold shape by vacuum drawing with plug assist, the sheets being sufficiently heat softened and tacky at this point to also seal together under the forming pressure. One such cup when so formed had an average wall thickness of about 25 mils and weighed approximately 4 grams. The cup when examined, showed adequate wall thickness uniformity despite the considerable stretching and thinning involved, and despite the use of relatively low density foam sheet for deep draw pressure thermoforming. The cup was also found to be sufficiently stiff without being unduly brittle and when filled with liquid did not leak. When cut lengthwise and examined it was found that the lamination of the plies was not entirely continuous at the ply interfaces, probably due to the surface irregularities of the foam sheet, but was laminated at particular spots as shown in FIG. 3. Also, it was discovered that the lamination of the plies was more continuous in the bottom and rim portion of the cup which had been subjected to greater crushing forces between the plug and mold when pressure thermoformed. This noncontinuous lamination, it is believed, allows the plies to slip somewhat with relation to each other when the walls of the cup are flexed, thereby to a great degree reducing internal stresses. Thus, it was discovered, that by controlling the pressure exerted on the walls of the cup during thermoforming, the extend of lamination at ply interfaces could be somewhat controlled to give the receptacle even better toughness and flexibility characteristics.

Another cup was thermoformed in the above manner and of similar foam sheets except the sheet comprising the outer ply had a more coarse cell size of about 0.5 to 1.0 millimeters. The ease of thermoforming was found generally equivalent, and when examined the cup exhibited superior stiffness to the first-mentioned cup, apparently because of its relatively more coarse cell outer ply.

A modified form of the invention is shown in FIG. 3. Here the laminated walls 12 and 14 comprise an inner ply 22 and outer ply 24 of a fine closed cell plastic foam, secured to the respective adjacent sides of an intermediate ply 26, which intermediate ply is formed of a relatively more coarse cell foam. This cup illustrates a particularly effective method of utilizing the excellent stiffness characteristics of large cell foam, while also guarding against its brittle tendencies. While a crack may develop in the more brittle intermediate ply, by too severe a flexing, the tough relatively fine cell inner and outer plies will tend to prevent the further propagation of the crack, thus preventing the destruction of the receptacle.

In one specific embodiment a three-ply cup 10, having desirable structural properties, could be thermoformed from three sheets of about 65 mil thick polystyrene foam having a density of about 10 lbs./cu. ft. The sheets comprising the fine cell inner and outer plies could have an average cell size of about 0.1 to about 0.15 millimeters, while the sheet comprising the more coarse cell intermediate ply could have an average cell size of about 0.5 to about 1.0 millimeters.

Although this invention has been described with particular reference to closed cell polystyrene foam, mainly because of the relatively low cost of polystyrene raw material, other thermoplastic foams might be readily substituted therefore. An open cell foam, such as open cell polystyrene foam, for instance, might be desired as an inner ply on meat or poultry trays to absorb juices given off by the contained product. Similarly, polyethylene foam or polypropylene foam may be desired for their excellent flexibility characteristics.

It is to be understood that the invention is not limited to particular receptacles or to a particular number of foam plies. For example, in thermoforming a large salad bowl, it is entirely conceivable that 20, 30, or even more plies would be desirable. Neither are the receptacles of this invention intended to be limited to a particular thermoforming process, the exact thermoforming technique desired being only a matter of choice or preference.

While certain representative embodiments and details have been shown for purposes of illustrating the invention, it will be apparent to those skilled in the art that various changes and modifications can be made therein without departing from the spirit and scope of the invention. Such changes can be made in other structures and materials which serve to achieve the principles of this invention.

I claim:

1. A receptacle thermoformed from a plurality of thermoplastic foam sheets, said thermoformed receptacle comprising bottom and sidewalls integrally formed together from said plurality of thermoplastic foam sheets, said bottom and sidewalls comprising a laminate of at least two plies of thermoplastic foam, said plies securely bonded together at the adjacent interface surfaces of said plies.

2. The receptacle of claim 1 wherein said plurality of thermoplastic foam sheets are securely bonded together with an adhesive composition.

3. The receptacle of claim 1 wherein at least one of said plies comprises an open cell foam material.

4. The receptacle of claim 1 wherein at least one of said plies comprises a closed cell foam material.

5. The receptacle of claim 1 wherein at least one of said plies comprises a pigmented foam material of different color than another of said plies.

6. The receptacle of claim 1 wherein one of said plies has a cell structure relatively finer than another of said plies.

7. The receptacle of claim 1 wherein one of said plies has a density relatively higher than another of said plies.

8. The receptacle of claim 1 wherein one of said plies is thinner than another of said plies.

9. The receptacle of claim 1 wherein at least one of said plies is polystyrene foam.

10. The receptacle of claim 1 wherein at least one of said plies is formed from foam sheet material having a low density.

11. The receptacle of claim 1 wherein said receptacle is thermoformed from multiple superimposed layers of thermoplastic foam sheet, said layers simultaneously thermoformed together to make said receptacle.

12. The receptacle of claim 11 wherein said foam sheets have a combined thickness of at least about 200 mils.

13. The receptacle of claim 11 comprising at least two plies of thermoplastic foam, one of said plies being thermoformed from thermoplastic foam sheet having an average cell diameter between about 0.1 to about 0.15 millimeters, another of said plies being thermoformed from thermoplastic foam sheet having an average cell diameter of between about 0.5 to about 1.0 millimeters, said thermoplastic foam sheets simultaneously thermoformed together to make said receptacles.

14. The receptacle of claim 1 wherein the average density of said thermoplastic foam sheets forming said plies is about 10 pounds per cubic foot or less.

15. The receptacle of claim 11 wherein said receptacle comprises a structurally firm thermoplastic foam of polystyrene.

16. The receptacle of claim 1 wherein said plies are secured bonded together by heat sealing.

17. The receptacle of claim 1 wherein said plurality of thermoplastic foam sheets are securely bonded together with a solvent.